US009983443B2

(12) United States Patent
Kim et al.

(10) Patent No.: US 9,983,443 B2
(45) Date of Patent: May 29, 2018

(54) DISPLAY DEVICE

(71) Applicant: Samsung Display Co., Ltd., Yongin, Gyeonggi-Do (KR)

(72) Inventors: Jang-Il Kim, Asan-si (KR); Un Byoll Ko, Yeoju-si (KR); Yeo Geon Yoon, Suwon-si (KR); Hyung Gi Jung, Cheonan-si (KR); Sei-Yong Park, Suwon-si (KR); Sung Hee Hong, Hwaseong-si (KR); Seung Jun Yu, Suwon-si (KR); Hyun-Ho Kang, Ansan-si (KR); Se Jin Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 213 days.

(21) Appl. No.: 14/801,597

(22) Filed: Jul. 16, 2015

(65) Prior Publication Data
US 2016/0202564 A1    Jul. 14, 2016

(30) Foreign Application Priority Data

Jan. 8, 2015 (KR) ........................ 10-2015-0002980

(51) Int. Cl.
| | | |
|---|---|---|
| *G02F 1/1343* | (2006.01) | |
| *G02F 1/1337* | (2006.01) | |
| *G02F 1/1362* | (2006.01) | |
| *G02F 1/1333* | (2006.01) | |

(52) U.S. Cl.
CPC .. *G02F 1/134309* (2013.01); *G02F 1/133345* (2013.01); *G02F 1/133707* (2013.01); *G02F 2001/134345* (2013.01); *G02F 2001/134381* (2013.01); *G02F 2001/136218* (2013.01)

(58) Field of Classification Search
USPC ........................................................ 349/129
See application file for complete search history.

(56) References Cited

U.S. PATENT DOCUMENTS

| | | | |
|---|---|---|---|
| 8,094,277 B2 | 1/2012 | Tasaka et al. | |
| 8,379,176 B2 | 2/2013 | Kim et al. | |
| 8,421,986 B2 | 4/2013 | Chen et al. | |
| 8,564,745 B2 | 10/2013 | Kim | |
| 2006/0023137 A1* | 2/2006 | Kamada | G02F 1/136213 349/44 |

FOREIGN PATENT DOCUMENTS

| | | |
|---|---|---|
| KR | 10-0193656 | 2/1999 |
| KR | 10-2005-0121881 | 12/2005 |
| KR | 10-2008-0082086 | 9/2008 |
| KR | 10-2009-0036870 | 4/2009 |

\* cited by examiner

*Primary Examiner* — Wen-Ying P Chen
(74) *Attorney, Agent, or Firm* — Innovation Counsel LLP

(57) ABSTRACT

A display device may include a floating electrode, a common-voltage electrode, a transistor, and a pixel electrode. The floating electrode may be electrically floating. The common-voltage electrode may be electrically connected to a voltage source. The pixel electrode may be electrically connected to the transistor. A first portion of the pixel electrode may overlap neither of the floating electrode and the common-voltage electrode in a direction perpendicular to at least one of the pixel electrode and an image display side of the display device. A second portion of the pixel electrode may overlap the common-voltage electrode. A third portion of the pixel electrode may overlap the floating electrode.

19 Claims, 24 Drawing Sheets

DISPLAY DEVICE

CROSS-REFERENCE TO RELATED APPLICATION

This application claims priority to and the benefit of Korean Patent Application No. 10-2015-0002980 filed in the Korean Intellectual Property Office on Jan. 8, 2015; the entire contents of the Korean Patent Application are incorporated herein by reference.

BACKGROUND

(a) Field

The present invention is related to a display device, such as a liquid crystal display device.

(b) Description of the Related Art

Display devices may be used in various electronic devices, such as computer monitors, televisions, mobile phones, etc. Display devices may include cathode ray tube display devices, liquid crystal display devices, plasma display devices, etc.

As an example, a liquid crystal display device may include two panels with field generating electrodes (such as a pixel electrode and a common electrode) and may include a liquid crystal layer interposed between the two panels. The liquid crystal display device may display an image by applying a voltage to the field generating electrode to generate an electric field in the liquid crystal layer. The electric field may determine orientations of liquid crystal molecules of the liquid crystal layer, for controlling transmission of light through the liquid crystal layer.

The above information disclosed in this Background section is for enhancement of understanding of the background of the invention. The Background section may contain information that does not form the prior art that is already known in this country to a person of ordinary skill in the art.

SUMMARY

An embodiment of the present invention may be related to a display device. The display device may include a floating electrode, a common-voltage electrode, a transistor, and a pixel electrode. The floating electrode may be electrically floating. The common-voltage electrode may be electrically connected to a voltage source. The pixel electrode may be electrically connected to the transistor. A first portion of the pixel electrode may overlap neither of the floating electrode and the common-voltage electrode in a direction perpendicular to at least one of the pixel electrode and an image display side of the display device. A second portion of the pixel electrode may overlap the common-voltage electrode in the direction. A third portion of the pixel electrode may overlap the floating electrode in the direction.

The display device may include a common electrode and a liquid crystal layer. The liquid crystal layer may be positioned between the pixel electrode and the common electrode. The pixel electrode may be positioned between the liquid crystal layer and the common-voltage electrode.

The common-voltage electrode may be spaced from the transistor in a plan view of the display device.

A material of the common-voltage electrode may be identical to a material of the floating electrode.

The floating electrode may be positioned between two portions of the common-voltage electrode.

The third portion of the pixel electrode may overlap a center portion of the floating electrode.

The third portion of the pixel electrode may overlap at least two edges of the floating electrode.

The second portion of the pixel electrode may surround the first portion of the pixel electrode.

The third portion of the pixel electrode may be positioned closer to the transistor than at least one of the first portion of the pixel electrode and the second portion of the pixel electrode.

The common-voltage electrode may have two slits. A branch part of the pixel electrode may be positioned between the two slits in a plan view of the display device.

The display device may include a non-conductive member. The non-conductive member may directly contact each of the floating electrode and the common-voltage electrode. The non-conductive member may include at least one of a color filter, a light-blocking member, and an overcoat.

The display device may include a passivation layer. The passivation layer may directly contact each of the floating electrode, the common-voltage electrode, and the pixel electrode.

A first portion of the passivation layer may overlap the floating electrode in the direction. A second portion of the passivation layer may be positioned between the pixel electrode and the common-voltage electrode in the direction. A thickness of the first portion of the passivation layer in the direction may be less than a thickness of the second portion of the passivation layer in the direction.

A third portion of the passivation layer may overlap the floating electrode in the direction and may be positioned between the first portion of the passivation layer and the second portion of the passivation layer. The thickness of the first portion of the passivation layer in the direction may be less than a thickness of the third portion of the passivation layer in the direction. The thickness of the third portion of the passivation layer in the direction may be less than the thickness of the second portion of the passivation layer in the direction.

A third portion of the passivation layer may be positioned between the pixel electrode and the common-voltage electrode and may be positioned between the first portion of the passivation layer and the second portion of the passivation layer. A thickness of the third portion of the passivation layer in the direction may be less than the thickness of the second portion of the passivation layer in the direction. The thickness of the third portion of the passivation layer in the direction may be equal to the thickness of the first portion of the passivation layer in the direction.

A third portion of the passivation layer may overlap the common-voltage electrode without overlapping the pixel electrode in the direction and may be positioned between the first portion of the passivation layer and the second portion of the passivation layer. A thickness of the third portion of the passivation layer in the direction may be less than the thickness of the second portion of the passivation layer in the direction. The thickness of the third portion of the passivation layer in the direction may be greater than or equal to the thickness of the first portion of the passivation layer in the direction.

An embodiment of the present invention may be related to a liquid crystal display, which may include the following elements: a first insulation substrate; a thin film transistor positioned on the first insulation substrate; a pixel electrode electrically connected to the thin film transistor; a common-voltage electrode partially overlapping the pixel electrode; a floating electrode partially overlapping the pixel electrode; a second insulation substrate facing and spaced apart from the first insulation substrate; a common electrode positioned on the second insulation substrate; and a liquid crystal layer positioned between the first insulation substrate and the second insulation substrate. The common-voltage electrode is insulated from the pixel electrode and may receive a common voltage. The floating electrode is insulated from the pixel electrode and the common-voltage electrode. A pixel including the thin film transistor includes a first region where a portion of the pixel electrode is positioned, a second region where the pixel electrode overlaps the common-voltage electrode, and a third region where the floating electrode is positioned. In the pixel, voltage differences from voltage of the common electrode may be highest at the first region, medium at the second region, and lowest at the third region.

The pixel electrode may include first cross stem parts positioned in the first region and the second region, a plurality of first fine branch parts extending from the first cross stem parts, and a connection part positioned in the third region.

The common-voltage electrode may include an opening positioned in the first region and a plate part positioned in the second region.

The floating electrode may include a second cross stem part positioned in the third region and a plurality of second fine branch parts extending from the second cross stem part.

The common-voltage electrode may substantially surround the floating electrode.

The connection part may have at least one of a cross-shaped member and a quadrangle-shaped member. The connection part may overlap the floating electrode.

The opening may have a rhombus shape.

The plate part may further include a slit, and the slit may overlap the first fine branch part.

The floating electrode may be in an electrically floating state.

The thin film transistor may include a gate electrode protruding from the gate line, a semiconductor layer positioned on the gate electrode, and a source electrode and a drain electrode positioned on the semiconductor layer.

The liquid crystal display may further include the following elements: a first passivation layer positioned on the data line and the drain electrode; and a second passivation layer positioned on the common-voltage electrode and the floating electrode. The pixel electrode is positioned on the second passivation layer.

At least one of the color filter and the light blocking member may be positioned on the first passivation layer.

The second passivation layer may have different thicknesses.

A thickness of the second passivation layer positioned in the first region may be larger than thicknesses of the second passivation layer positioned in the second region and the third region.

The thickness of the second passivation layer positioned in the second region may be larger than the thickness of the second passivation layer positioned in the third region.

In a display device according to one or more embodiments of the present invention, three regions of a pixel may respectively have three different electric field magnitudes. Therefore, the pixel may provide three difference luminance levels. Advantageously, the display device may be able to display images with satisfactory visibility (e.g., side visibility). For providing the three different luminance levels, the pixel may need only one transistor. Advantageously, a satisfactory aperture ratio may be attained, such that potential afterimage may be alleviated. Relations among the three different electric field magnitudes may be optimized though configuration of distances between electrodes in the pixel. Advantageously, a response speed and/or image texture control associated with the display device may be optimized.

DETAILED DESCRIPTION OF EMBODIMENTS

Figure 1:
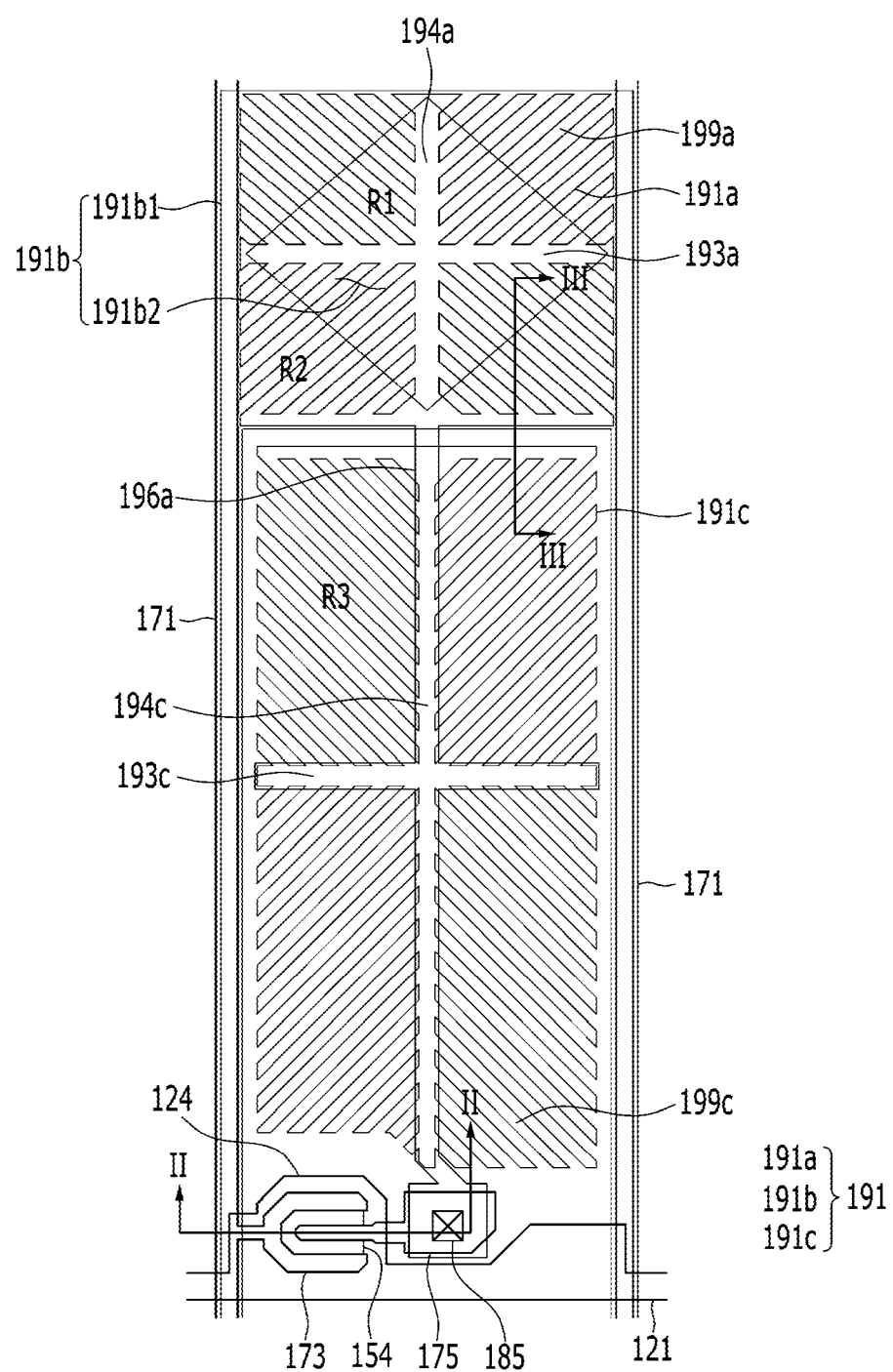
FIG. 1 is a schematic plan view illustrating elements and/or structures in one pixel area of a display device according to an embodiment of the present invention.

Embodiments of the present invention are described with reference to the accompanying drawings. As those skilled in the art would realize, the described embodiments may be modified in various different ways, all without departing from the spirit or scope of the present invention.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the drawings, thicknesses of layers, films, panels, regions, etc., may be exaggerated for clarity. Like reference numerals may designate like elements throughout the specification. When a first element (such as a layer, film, region, or substrate) is referred to as being "on" a second element, the first element can be directly on the second element, or one or more intervening elements may also be present. In contrast, when a first element is referred to as being "directly on" a second element, there are no intended intervening elements between the first element and the second element.

In the description, the term "connect" may mean "electrically connect"; the term "insulate" may mean "electrically insulate".

Figure 2:
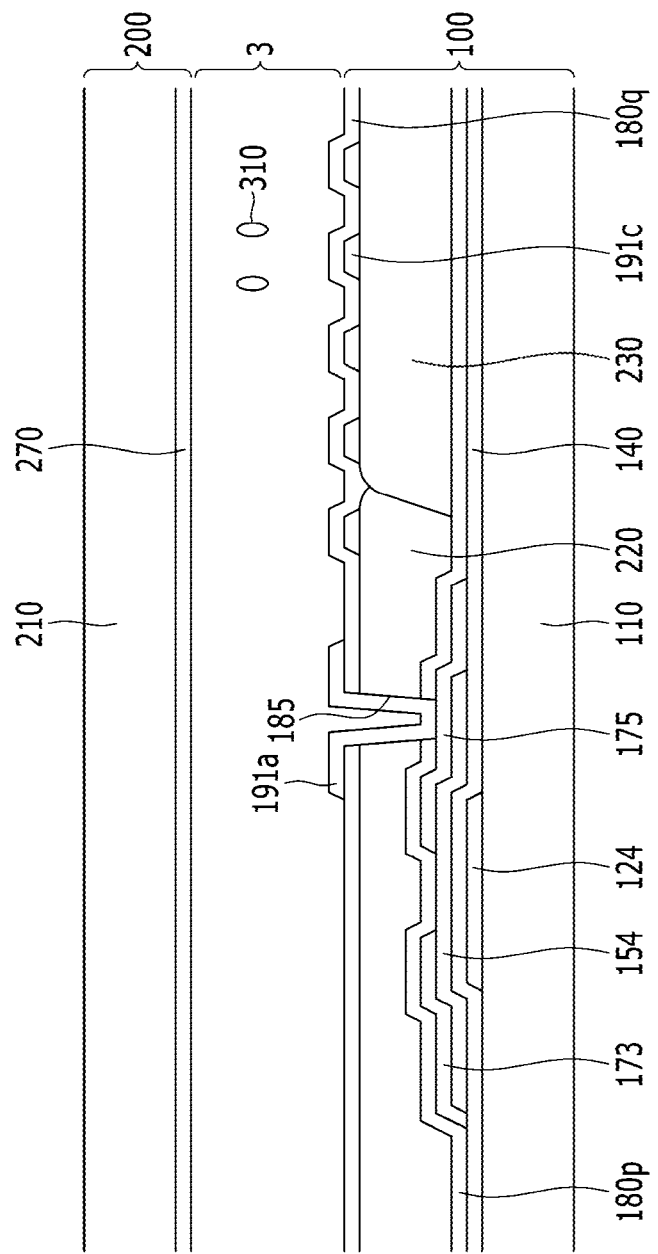
FIG. 2 is a schematic cross-sectional view taken along line II-II indicated in FIG. 1 according to an embodiment of the present invention.
Figure 3:
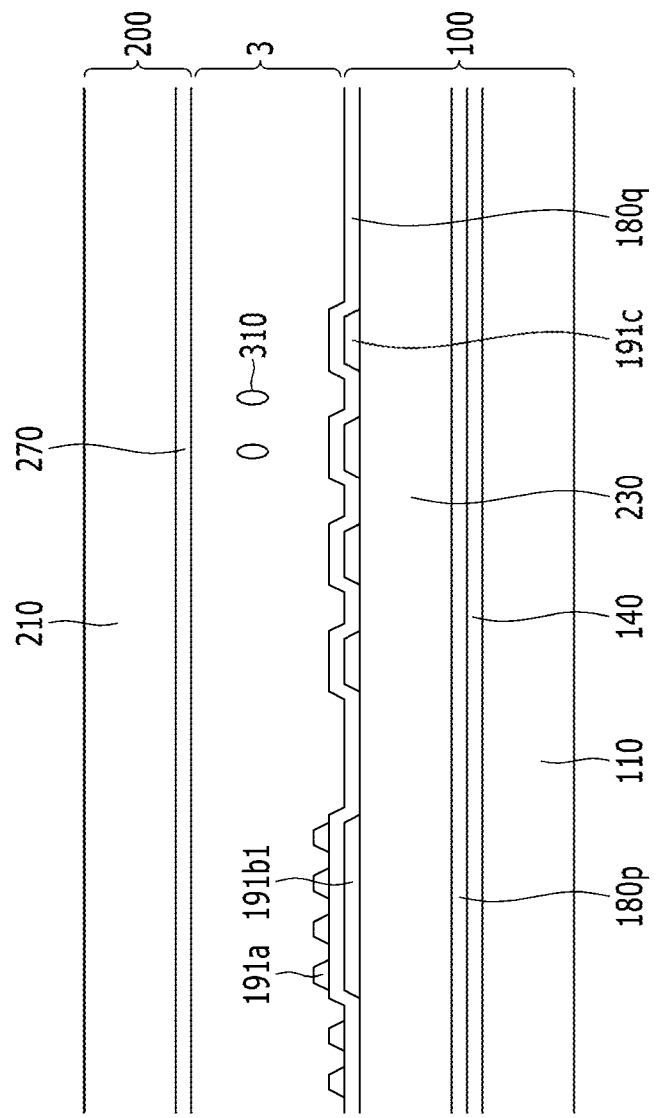
FIG. 3 is a schematic cross-sectional view taken along line III-III indicated in FIG. 1 according to an embodiment of the present invention.
Figure 4:
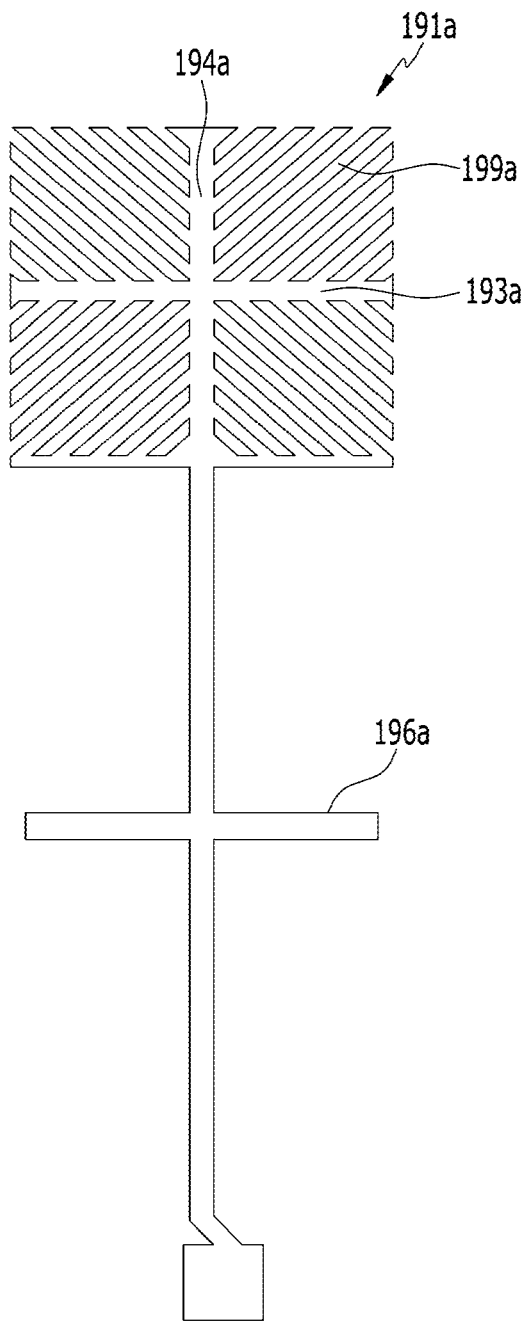
FIG. 4 is a schematic plan view illustrating a pixel electrode according to an embodiment of the present invention.
Figure 5:
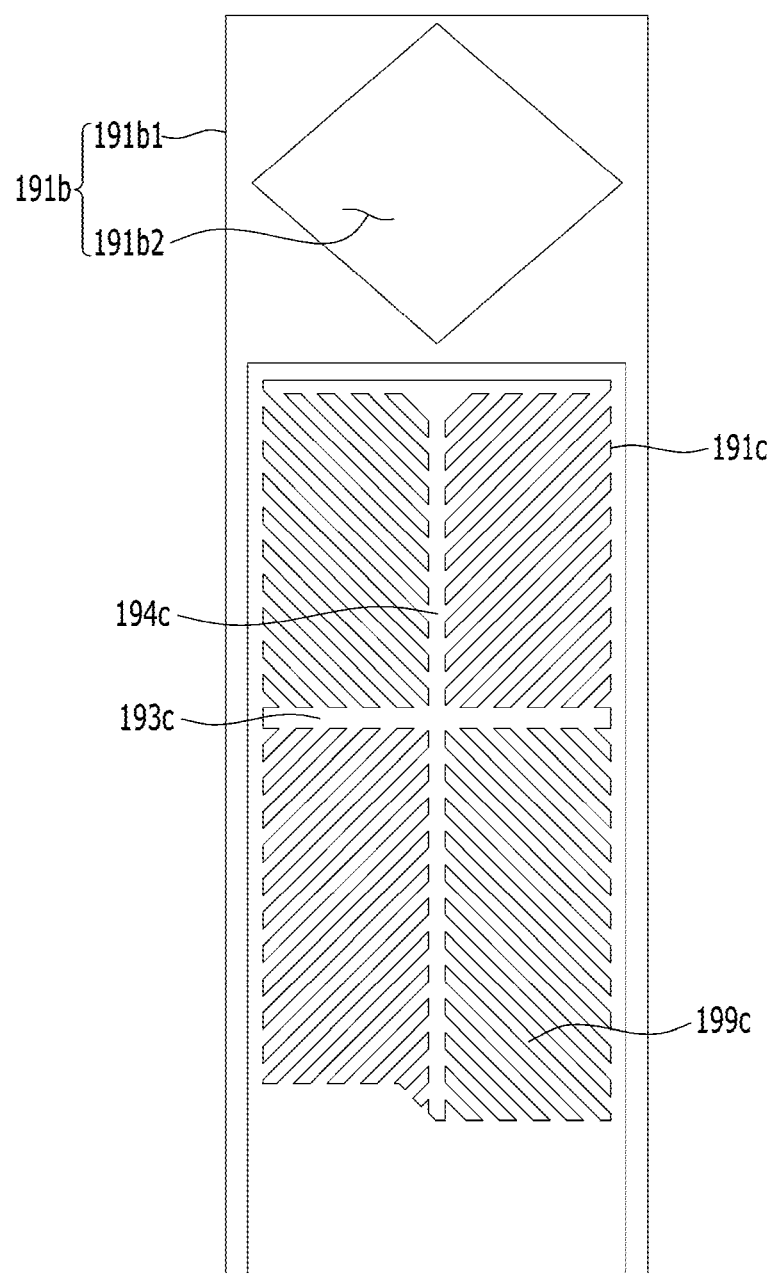
FIG. 5 is a schematic plan view illustrating a common-voltage electrode and a floating electrode according to an embodiment of the present invention.

FIG. 1 is a schematic plan view illustrating elements and/or structures in one pixel area of a display device according to an embodiment of the present invention. FIG. 2 is a schematic cross-sectional view taken along line II-II indicated in FIG. 1. FIG. 3 is a schematic cross-sectional view taken along line III-III indicated in FIG. 1. FIG. 4 is a schematic plan view illustrating a pixel electrode according to an embodiment of the present invention. FIG. 5 is a schematic plan view illustrating a common-voltage electrode and a floating electrode according to an embodiment of the present invention.

Referring to FIG. 1 and FIG. 2, gate conductors including a gate line 121 and a gate electrode 124 may be positioned on a first insulation substrate 110, which may be made of a transparent material, e.g., one or more of transparent glass, transparent plastic, etc. The gate electrode 124 may protrude from the gate line 121. The gate line 121 may include a wide end portion (not illustrated) for contact with another element, e.g., an element of a driving circuit.

The gate conductors may be made of at least one of aluminum-based metals such as aluminum (Al) or an aluminum alloy, silver-based metals such as silver (Ag) or a silver alloy, copper-based metals such as copper (Cu) or a copper alloy, molybdenum based metals such as molybdenum (Mo) or a molybdenum alloy, chromium (Cr), tantalum (Ta), and titanium (Ti). The gate conductor may have a multi-layered structure including at least two conductive layers having different physical properties.

The gate line 121 crosses a plurality of pixel areas in a first direction, e.g., a horizontal direction.

A gate insulating layer 140 is positioned on the gate conductor. The gate insulating layer 140 may be made of silicon nitride (SiNx) and/or silicon oxide (SiOx) and may have a multi-layered structure including at least two insulating layers having different physical properties.

A semiconductor layer 154 is positioned on the gate insulating layer 140. The semiconductor layer 154 overlaps the gate electrode 124 and may be made of at least one of amorphous silicon, crystalline silicon, etc.

An ohmic contact (not illustrated) may be positioned on the semiconductor layer 154. No ohmic contact may be needed if the semiconductor layer 154 is made of an oxide semiconductor.

Data conductors including a data line 171, a source electrode 173, and a drain electrode 175 may be positioned on the semiconductor layer 154 and the gate insulating layer 140. The data line 171 may include a wide end portion (not illustrated) for contact with another element, e.g., an element of a driving circuit.

The data conductors, the ohmic contact, and the semiconductor layer 154 may be substantially simultaneously formed using a single mask in a same process.

The data line 171 may transfer a data signal, may extend in a second direction, e.g., a vertical direction, and may cross the gate line 121. The above-described first direction and second direction may be substantially perpendicular to each other.

The source electrode 173 may extend from the data line 171 and may have a C-shape structure. One or more portions of the drain electrode 175 may be parallel to one or more portions of the source electrode 173 and/or may be positioned between two portions of the source electrode 173. A portion of the drain electrode 175 may contact a portion of a pixel electrode 191a that extends through a contact hole 185.

The gate electrode 124, the source electrode 173, and the drain electrode 175 form a thin film transistor (TFT) together with the semiconductor layer 154. A channel region of the thin film transistor is positioned in the semiconductor layer 154 between the source electrode 173 and the drain electrode 175.

The data conductors may be made of at least a refractory metal, such as one or more of molybdenum, chromium, tantalum, titanium, an alloy of two or more of these metals, etc. The data conductors may have a multi-layered structure (or multilayer structure) including a refractory metal layer (not illustrated) and a low-resistance conductive layer (not illustrated).

In an embodiment, the multi-layered structure includes a lower layer made of chromium or molybdenum (alloy) and includes an upper layer made of aluminum (alloy). In an embodiment, the multi-layered structure includes a lower layer made of molybdenum (alloy), an intermediate layer made of aluminum (alloy), and an upper layer made of molybdenum (alloy). In an embodiment, the data conductors may be made of various metals or conductors in addition to or alternative to the above materials.

A first passivation layer 180p is positioned on the data conductors 171, 173, and 175, the gate insulating layer 140, and an exposed portion of the semiconductor layer 154. The first passivation layer 180p may be made of at least one of an organic insulating material, an inorganic insulating material, etc.

A color filter 230 and a light blocking member 220 may be positioned on the first passivation layer 180p. The color filter 230 may be configured for displaying one of several primary colors, such as one of red, green, and blue, or yellow, cyan, magenta, etc. In an embodiment, the color filter 230 may be configured for displaying a mixed color of primary colors or for displaying white.

In an embodiment of the present invention, the light blocking member 220 and the color filter 230 may be positioned on the upper panel 200. In an embodiment of the present invention, the color filter 230 and the light blocking member 220 may be positioned on the lower panel 100 and the upper panel 200, respectively.

A common-voltage electrode 191b and a floating electrode 191c may be positioned on the color filter 230 and the light blocking member 220. In an embodiment, an overcoat (not illustrated) may be positioned on the color filter 230 and the light blocking member 220, and the common-voltage electrode 191b and the floating electrode 191c may be positioned on the overcoat.

Referring to FIG. 5, the common-voltage electrode 191b may include a plate part 191b1 and may have an opening 191b2. Common-voltage electrodes 191b positioned in adjacent pixel areas may be electrically connected to each other. The common-voltage electrodes 191b may be electrically connected to a voltage source and may receive a common voltage from the voltage source through, for example, a connection (not illustrated) with another element, e.g., an element of a driving circuit.

The common-voltage electrode 191b may include an extended part, which may extend parallel to an edge of the floating electrode 191c. The floating electrode 191c may be positioned between two extended portions of the common-voltage electrode 191b.

The floating electrode 191c and the common-voltage electrode 191b are positioned on the same layer and may be formed in a same process step. The floating electrode 191c includes cross stem parts 193c and 194c and includes a plurality of fine branch parts 199c extending from the cross stem parts 193c and 194c. The fine branch parts 199c may extend in a diagonal direction from the second cross stem parts 193c and 194c and may extend perpendicular to, parallel to, or aligned with each other.

The floating electrode 191c is insulated from other constituent elements, and substantially no voltage may be applied to the floating electrode 191c, such that the floating electrode 191c may be electrically floating.

A second passivation layer 180q is positioned on the common-voltage electrode 191b and the floating electrode 191c. The second passivation layer 180q may be made of at least one of an organic insulating material, an inorganic insulating material, etc.

The pixel electrode 191a is positioned on the second passivation layer 180q. The pixel electrode 191a is connected to the drain electrode 175 through a contact hole 185 formed in the first passivation layer 180p, the light blocking member 220, and the second passivation layer 180q and may receive a data voltage from the drain electrode 175.

Referring to FIG. 4, the pixel electrode 191a includes cross stem parts 193a and 194a, fine branch parts 199a extending from the first cross stem parts 193a and 194a, and a connection part 196a. The fine branch parts 199a may extend in a diagonal direction from the cross stem parts 193a and 194a, and may extend orthogonal to, parallel to, or aligned with each other The connection part 196a is connected to the cross stem parts 193a and 194a and/or the first fine branch part 199a at a connection and may extend from the connection to the contact hole 185. An end of the connection part 196a is physically and electrically connected to the drain electrode 175 through the contact hole 185.

The connection part 196a may have a cross shape, as illustrated in FIG. 1 and/or FIG. 4, and may overlap the cross stem parts 193c and 194c of the floating electrode 191c. In an embodiment, the connection part 196a may have a structure different from the cross shape.

According to an embodiment of the present invention, in a first region R1, a first portion of the pixel electrode 191a (e.g., a part of the cross stem parts 193a and 194a and a part of the fine branch parts 199a) may overlap neither of the common-voltage electrode 191b and the floating electrode 191c in a direction perpendicular to the pixel electrode 191a and/or perpendicular to an image display side of the display device. The image display side of the display device may be an outer side of the panel 200. In a second region R2, a second portion of the pixel electrode 191a may overlap the plate part 191b1 of the common-voltage electrode 191b in the direction, with the second passivation layer 180q being positioned between the pixel electrode 191a and the common-voltage electrode 191b. In a third region R3, a third portion of the pixel electrode 191a (e.g., the connection part 196a) may overlap the floating electrode 191c in the direction.

The pixel electrode 191a may receive a data voltage through the contact hole 185 from the drain electrode 175. The common-voltage electrode 191b may receive a common voltage provided by a voltage source. The floating electrode 191c may be insulated from other constituent elements and may be electrically floating without substantially receiving a supplied voltage.

In an embodiment, the pixel electrode 191a, the common-voltage electrode 191b, and the floating electrode 191c may provide three different electric field magnitudes in the first region R1, the second region R2, and the third region R3, respectively, in cooperation with a common electrode 270. The common electrode 270 may be electrically connected to the voltage source and/or may receive the common voltage from the voltage source.

Among the three different magnitudes in the three regions, the magnitude of the electric field applied to the liquid crystal layer portion positioned in the first region R1 may be the largest, and a magnitude of the electric field applied to the liquid crystal layer portion positioned in the third region R3 may be the smallest. The magnitude of the electric field applied to the liquid crystal layer portion positioned in the second region R2 may be smaller than the magnitude of the electric field applied to the liquid crystal layer portion positioned in the first region R1 and may be larger than the magnitude of the electric field applied to the liquid crystal layer portion positioned in the third region R3.

The common electrode 270 is positioned on a second insulation substrate 210, which may be made of transparent glass and/or transparent plastic. The common electrode 270 may substantially cover a surface of the second insulation substrate 210.

Alignment layers (not illustrated) may be formed on inner surfaces of the panels 100 and 200 (which may face each other) and may be vertical alignment layers.

Polarizers (not illustrated) may be disposed on outer surfaces of the panels 100 and 200. Transmission axes of the two polarizers may be orthogonal to each other, and one of the transmission axes may be parallel to the gate line 121. In an embodiment, a polarizer may be disposed on the outer surface of one of the panels 100 and 200, and no polarizer may be disposed on the outer surface of the other one of the panels 100 and 200.

A liquid crystal layer 3 may be positioned between the common electrode 270 and the pixel electrode 191a. The liquid crystal layer 3 may have a negative dielectric anisotropy, and liquid crystal molecules of the liquid crystal layer 3 may be oriented so that long axes of the liquid crystal molecules are substantially perpendicular to the panels 100 and 200 when no electric field is applied to the liquid crystal layer 3.

Incident light may be substantially blocked by the crossed polarizers when no electric field is applied to the liquid crystal layer 3.

Figure 6:
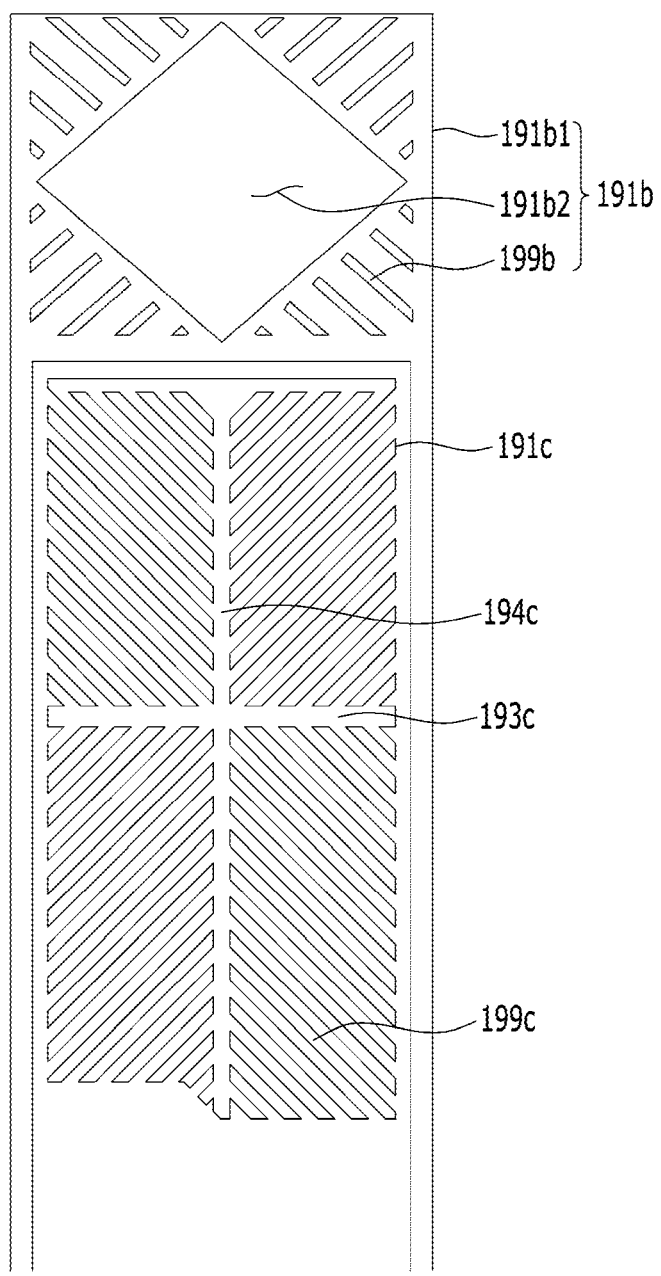
FIG. 6 is a schematic plan view illustrating a common-voltage electrode and a floating electrode according to an embodiment of the present invention.
Figure 7:
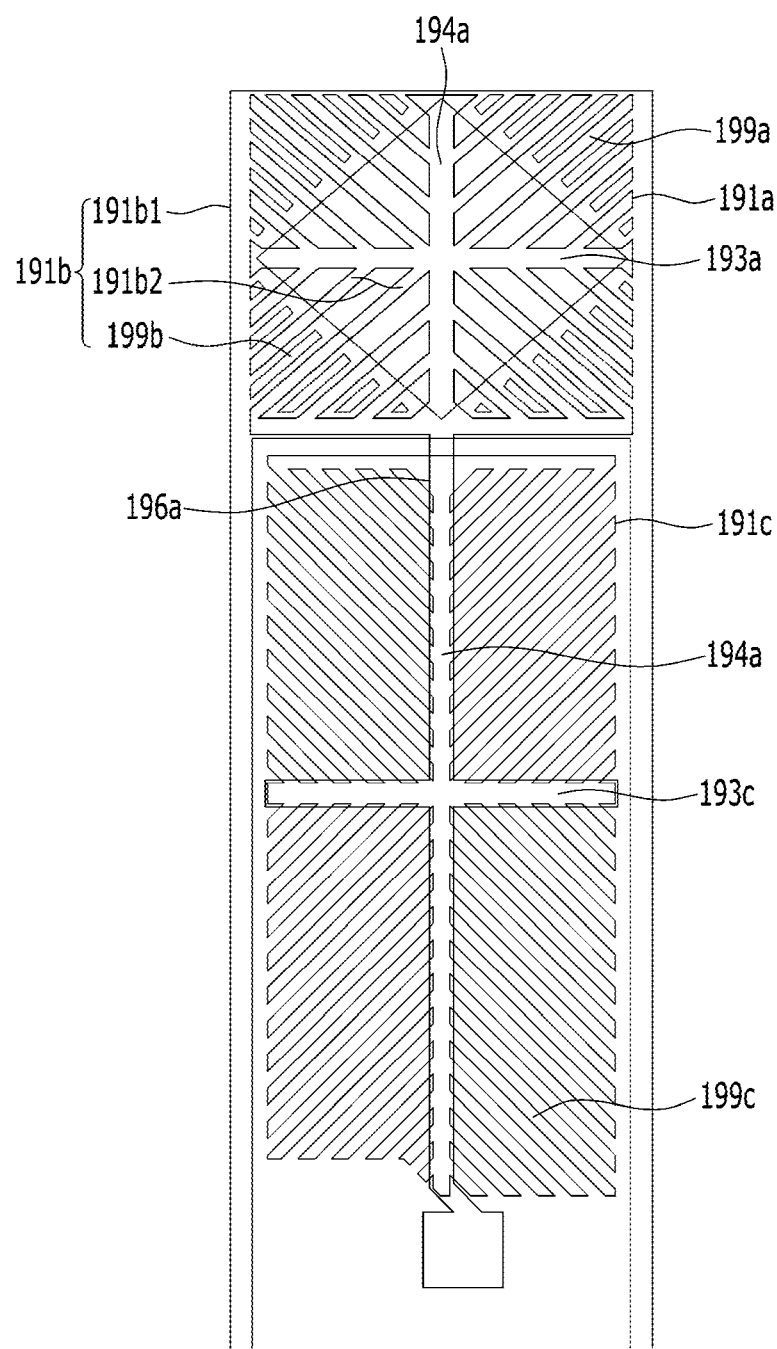
FIG. 7 is a schematic plan view illustrating a pixel electrode, a common-voltage electrode, and a floating electrode according to an embodiment of the present invention.
Figure 8:
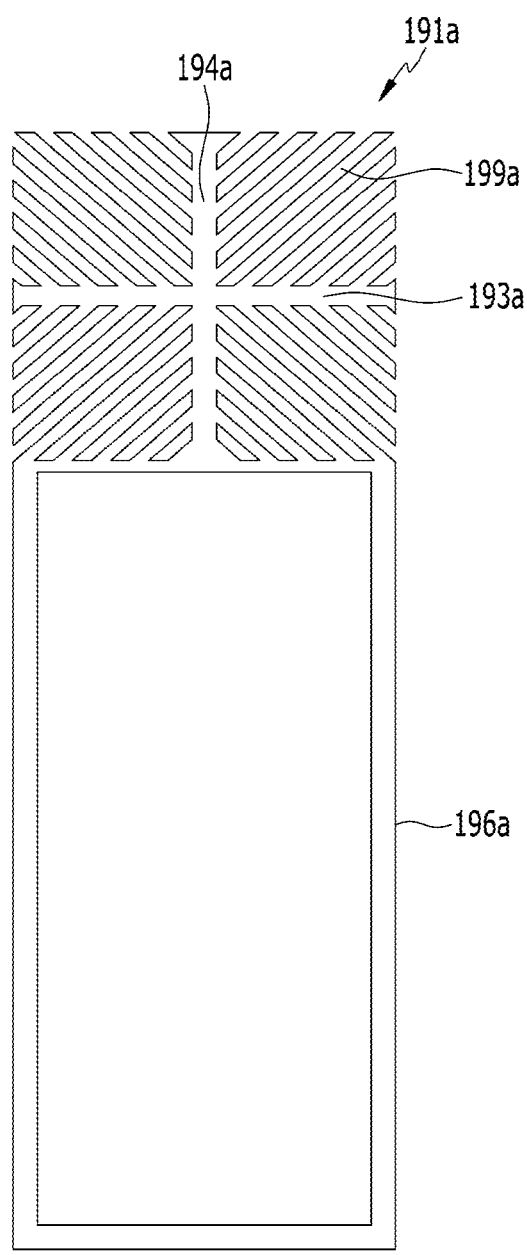
FIG. 8 is a schematic plan view illustrating a pixel electrode according to an embodiment of the present invention.
Figure 9:
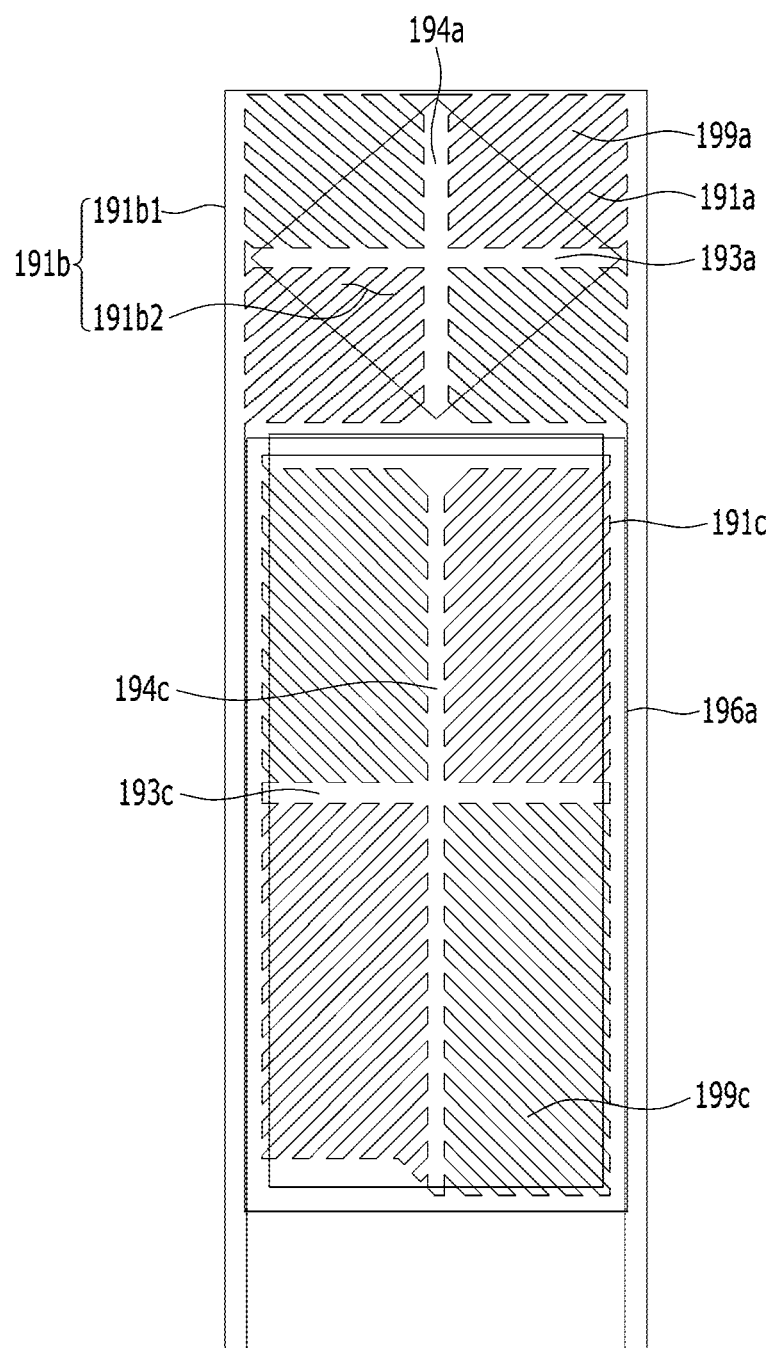
FIG. 9 is a schematic plan view illustrating a pixel electrode, a common-voltage electrode, and a floating electrode according to an embodiment of the present invention.
Figure 10:
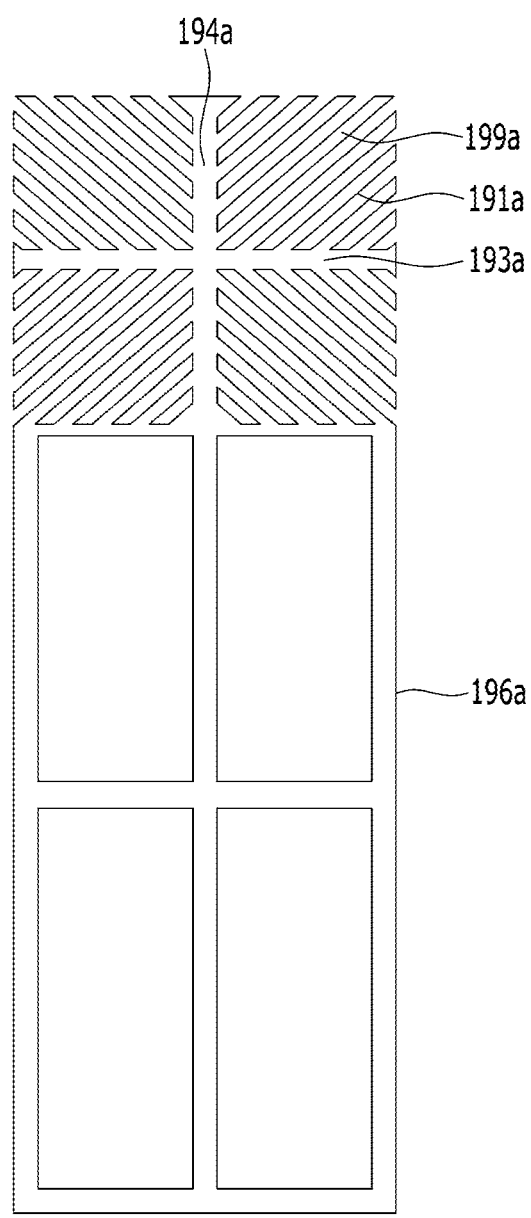
FIG. 10 is a schematic plan view illustrating a pixel electrode according to an embodiment of the present invention.
Figure 11:
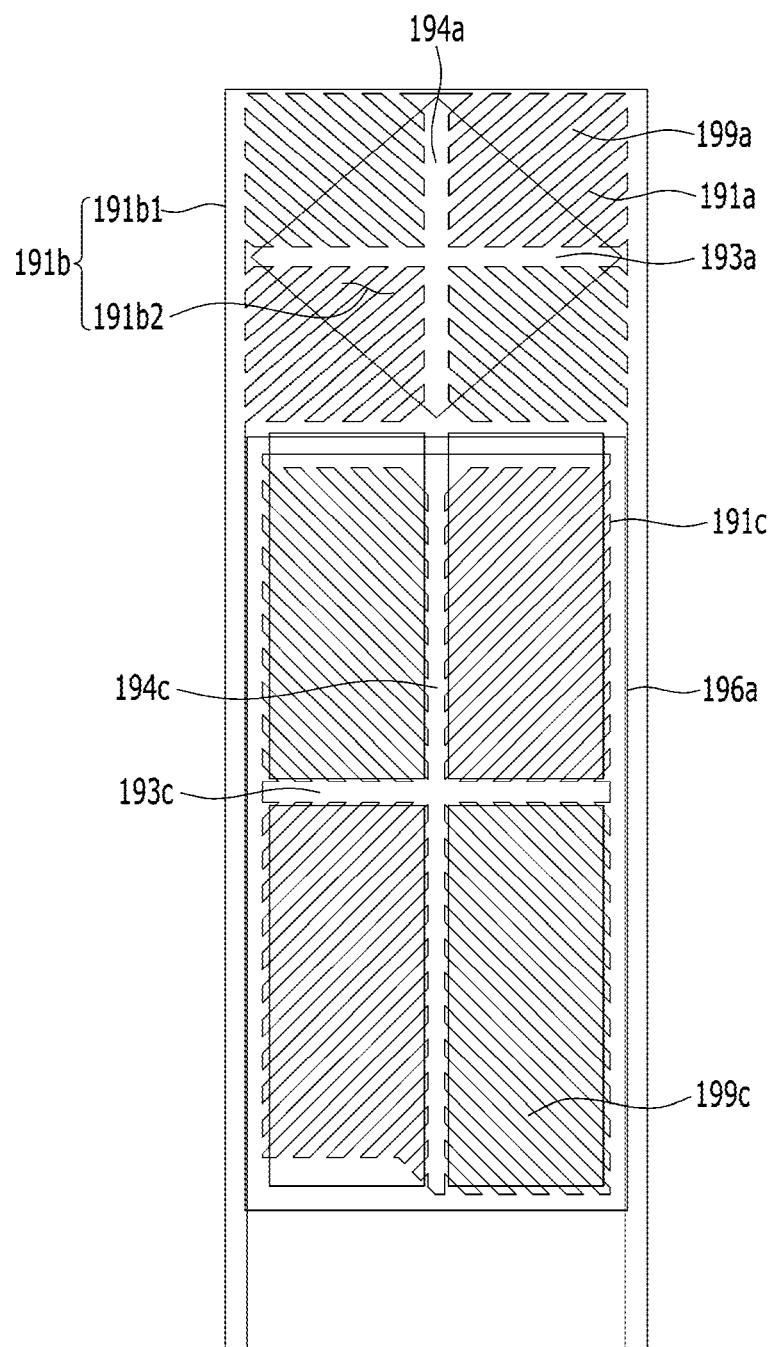
FIG. 11 is a schematic plan view illustrating a pixel electrode, a common-voltage electrode, and a floating electrode according to an embodiment of the present invention.

FIG. 6 is a schematic plan view illustrating a common-voltage electrode and a floating electrode according to an embodiment of the present invention. FIG. 7 is a schematic plan view illustrating a pixel electrode according to an embodiment of the present invention. FIG. 8 is a schematic plan view illustrating a pixel electrode according to an embodiment of the present invention. FIG. 9 is a schematic plan view illustrating a pixel electrode according to an embodiment of the present invention. FIG. 10 is a schematic plan view illustrating a pixel electrode according to an embodiment of the present invention. FIG. 11 is a schematic plan view illustrating a pixel electrode according to an embodiment of the present invention. FIG. 12A, FIG. 12B, FIG. 12C, and FIG. 12D are cross-sectional views taken along line III-III indicated in FIG. 1 according to one or more embodiments of the present invention. Elements discussed with references to one or more of FIG. 6, FIG. 7, FIG. 8, FIG. 9, FIG. 10, FIG. 11, FIG. 12A, FIG. 12B, FIG. 12C, and FIG. 12D may have features that are identical to or analogous to one or more of the features discussed above with reference to FIG. 1, FIG. 2, FIG. 3, FIG. 4, and FIG. 5. Description of identical or analogous features may not be repeated.

Referring to FIGS. 6 and 7, the common-voltage electrode 191b may have slits 199b positioned in the plate part 191b1.

A width of a slit 199b may be equal to a width of a fine branch part 199a of the pixel electrode 191a and/or a width of a fine branch part 199c of the floating electrode 191c. In an embodiment, as illustrated in FIG. 7, a fine branch part 199a of the pixel electrode 191a may be positioned between two slits 199b of the common-voltage electrode 191b in a plan view of a pixel of the display device.

Referring to FIGS. 8 and 9, the connection part 196a of the pixel electrode 191a may have bar members that enclose a quadrangle space in a plan view of the display device. The bar members may overlap end portions of fine branch part 199c of the floating electrode 191c.

The connection part 196a may be connected to the first fine branch part 199a and the cross stem parts 193a and 194a. A bar member (e.g., a lower portion of the connection part 196a) may include a protrusion that extends to be electrically and physically connected to a drain electrode through a contact hole.

Referring to FIGS. 10 and 11, the connection part 196a of the pixel electrode 191a may include a cross-shaped structure and bar members enclosing the cross-shaped structure in a plan view of the display device. The connection part 109a of the pixel electrode 191a may have four quadrangular openings in the plan view of the display device.

The connection part 196a may have bar members overlapping end portions of fine branch part 199c of the floating electrode 191c and may have a cross-shaped structure overlapping the cross stem parts 193c and 194c of the floating electrode 191c.

In various embodiments of the present invention, structures of the pixel electrode, the common-voltage electrode, and the floating electrode may be configured to have various shapes for optimizing the sizes and shapes of the regions R1, R2, and R3. Advantageously, quality of images displayed by display devices may be optimized.

FIG. 12A, FIG. 12B, FIG. 12C, and FIG. 12D are cross-sectional views taken along line III-III indicated in FIG. 1 according to one or more embodiments of the present invention.

Figure 12A:
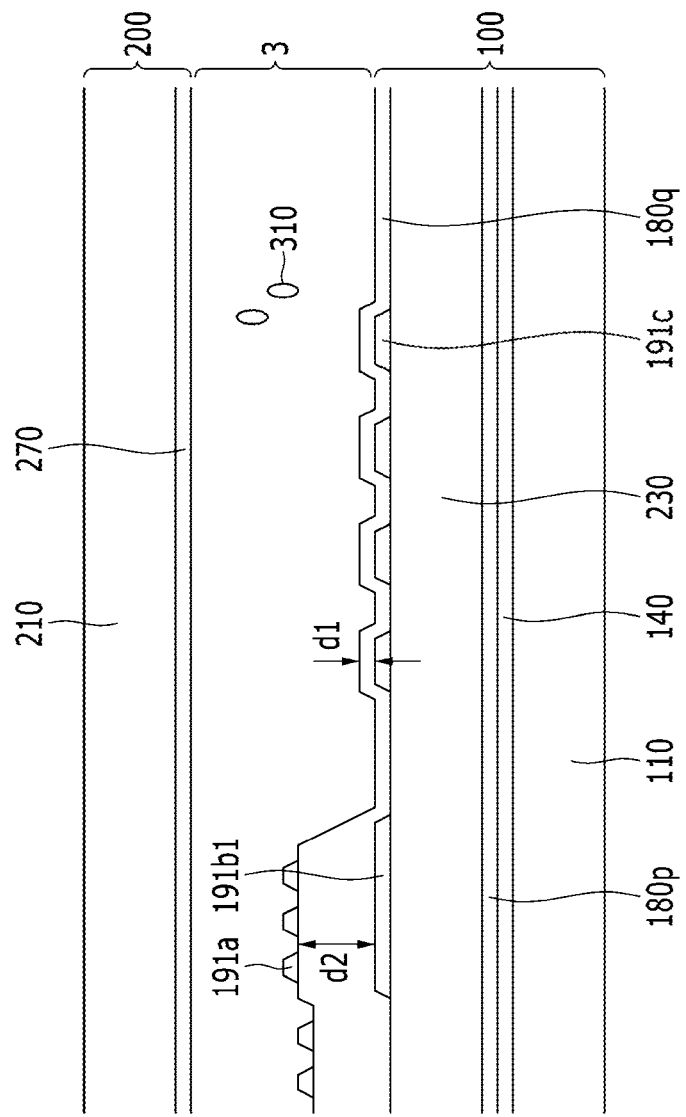
FIG. 12A is a schematic cross-sectional view taken along line III-III indicated in FIG. 1 according to an embodiment of the present invention.

Referring to FIG. 12A, a thickness d2 of a portion the second passivation layer 180q positioned in the second region R2 (where the pixel electrode 191a overlaps the common-voltage electrode 191b) may be larger than a thickness d1 of portions of the second passivation layer 180q positioned in the first region R1 and the third region R3.

In the second region R2, the pixel electrode 191a may be sufficiently spaced from the common-voltage electrode 191b by the thickness d2 of the second passivation layer 180q, such that a proper voltage ratio may be obtained between the first region R1 and the second region R2. Advantageously, transmittance associated with the liquid crystal layer 3 may be optimized.

In the third region R3, the small thickness d1 of the second passivation layer 180q may enable a sufficient capacitance formed between the floating electrode 191c and (the connection part 196a of) the pixel electrode 191a. Advantageously, texture control and/or transmittance associated with the liquid crystal layer 3 of the display device may be improved.

Figure 12B:
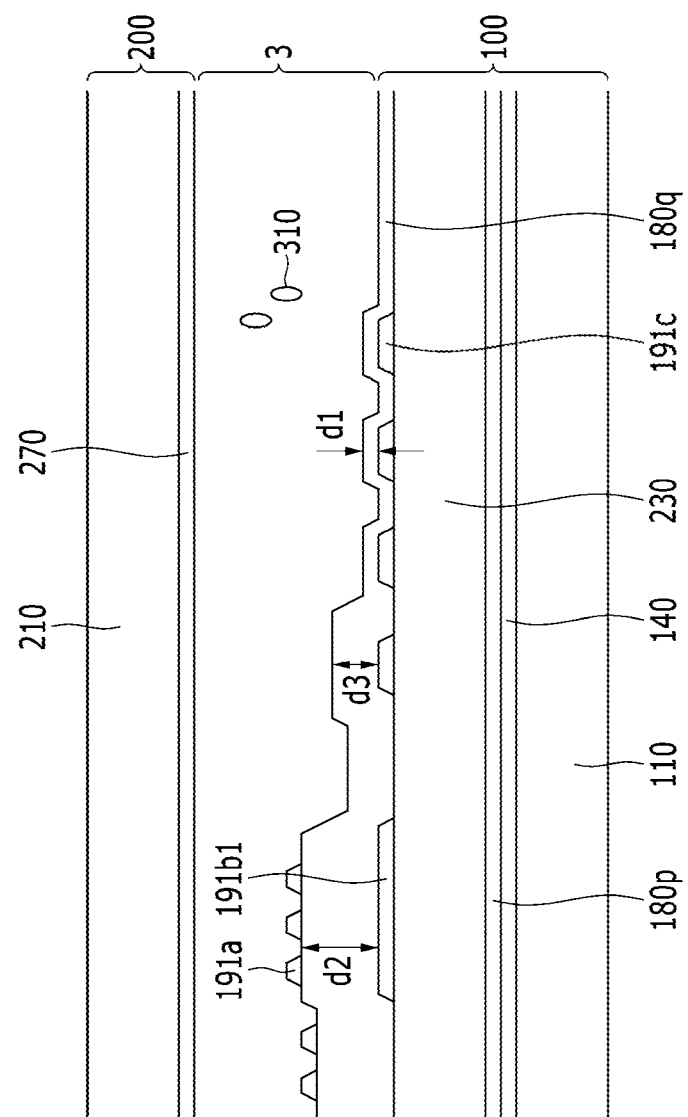
FIG. 12B is a schematic cross-sectional view taken along line III-III indicated in FIG. 1 according to an embodiment of the present invention.

Referring to FIG. 12B, portions of the second passivation layer 180q positioned in the third region R3 may have different thicknesses. In an embodiment, the thickness d3 of a portion of the second passivation layer 180q that is adjacent to the second region R2 and overlaps the floating electrode 191c may be smaller than the thickness d2 of a portion of the second passivation layer 180q positioned in the second region R2 and may be larger than the thickness d1 of a portion of the second passivation layer 180q positioned relatively close to the thin film transistor in the third region R3. The different thicknesses of the second passivation layer 180q in the region R3 may enable optimization of visibility associated with imaged displayed by the display device. In an embodiment, visibility may be optimized by gradually decreasing or increasing thicknesses of the second passivation layer 180q in the region R3 from the region R2 toward the thin film transistor.

Figure 12C:
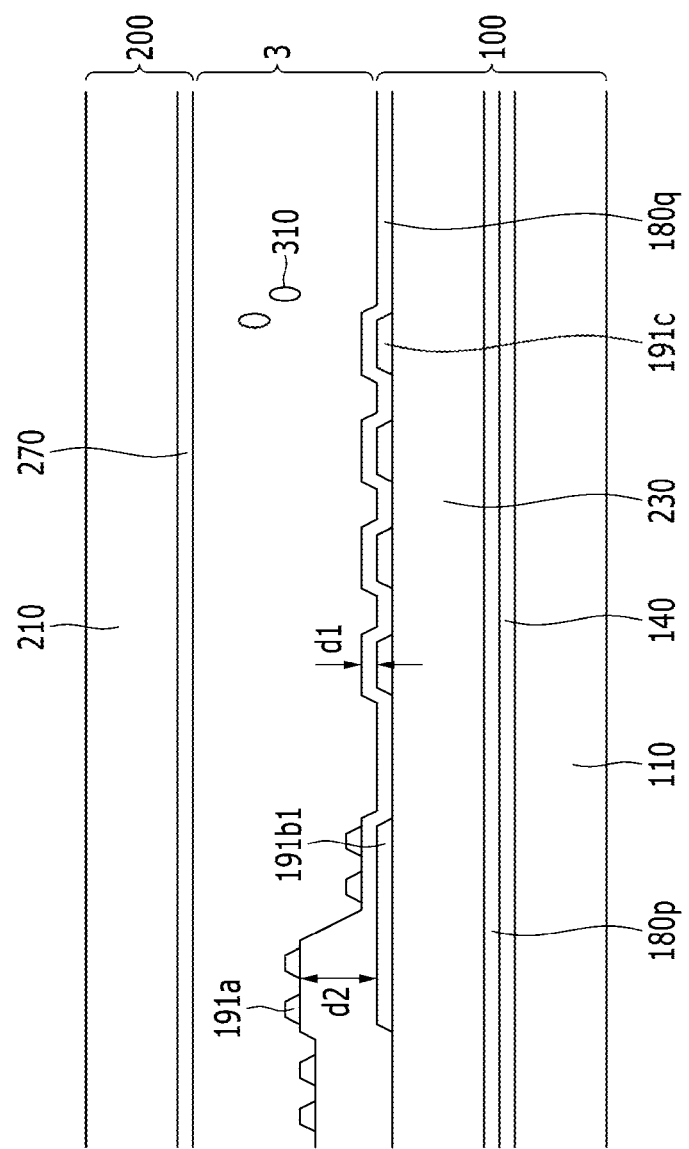
FIG. 12C is a schematic cross-sectional view taken along line III-III indicated in FIG. 1 according to an embodiment of the present invention.

Referring to FIG. 12C, portions of the second passivation layer 180q positioned in the second region R2 and positioned between the electrodes 191a and 191b may have different thicknesses. A first portion of the second passivation layer 180q in the region R2 may have a relatively large thickness d2. A second portion of the second passivation layer 180q between the first portion of the second portion of the passivation layer 180q and the region R3 may have a relatively small thickness d1. The different thicknesses of the second passivation layer 180q in the region R2 may enable optimization of visibility associated with imaged displayed by the display device.

Figure 12D:
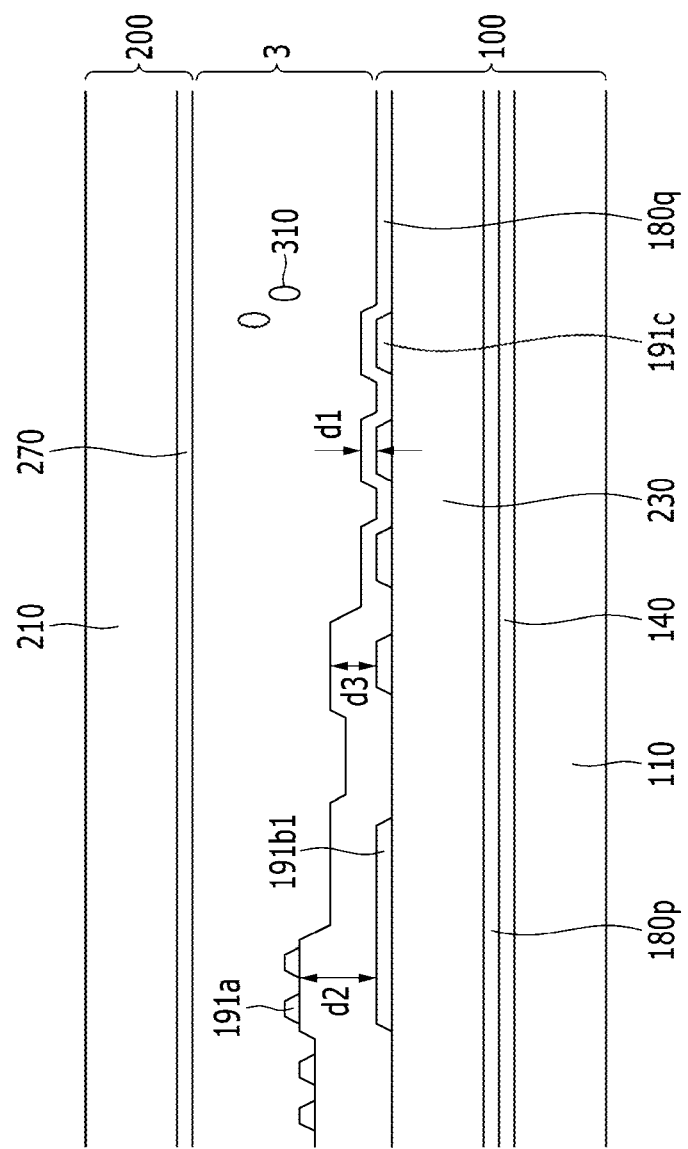
FIG. 12D is a schematic cross-sectional view taken along line III-III indicated in FIG. 1 according to an embodiment of the present invention.

Referring to FIG. 12D, a part of the second passivation layer 180q positioned in the second region R2 (where the pixel electrode 191a overlaps the common-voltage electrode 191b) may have a relatively large thickness d2, and a part of the second passivation layer 180q that overlaps the common-voltage electrode 191b without overlapping the pixel electrode 191a in a direction perpendicular to the substrate 110 may have a relatively small thickness d3. A part of the second passivation layer 180q positioned in the third region R3 may have a relatively small thickness d1, and a part of the second passivation layer 180q positioned in the third region R3 may have a relatively large thickness d3. The different thicknesses of the second passivation layer 180q in the regions R2 and R3 may enable optimization of visibility associated with imaged displayed by the display device.

According to embodiments of the present invention, thicknesses of the second passivation layer 180q may be controlled for controlling one or more of image visibility, transmittance, texture, etc. associated with the display device.

The above-described passivation layer having different thicknesses may be formed using a halftone mask and/or a slit mask. In an embodiment, an alternative method or an additional method may be used for forming the passivation layer.

Figure 13:
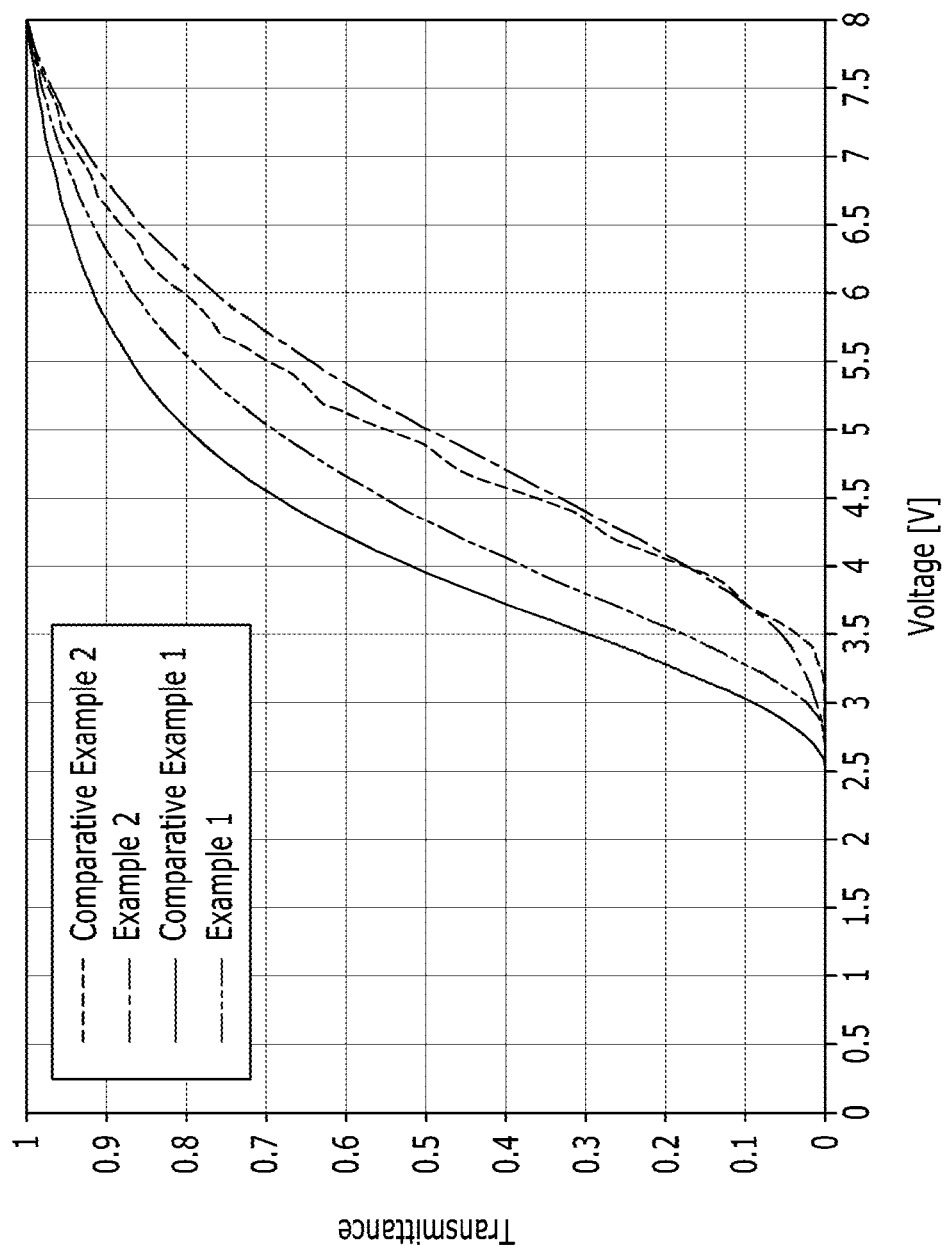
FIG. 13 illustrates voltage-transmittance (V-T) graphs related to Examples associated with embodiments of the present invention and gamma curve graphs related to Comparative Examples.

FIG. 13 illustrates voltage-transmittance (V-T) graphs related to Examples associated with embodiments of the present invention and gamma curve graphs related to Comparative Examples. Referring to FIG. 13, it can be seen that V-T (voltage-transmittance) graphs of Example 1 (common-voltage electrode) and Example 2 (floating electrode) of the present invention move to the right compared to Comparative Example 1 and Comparative Example 2. That is, the V-T curves are delayed.

Figure 14:
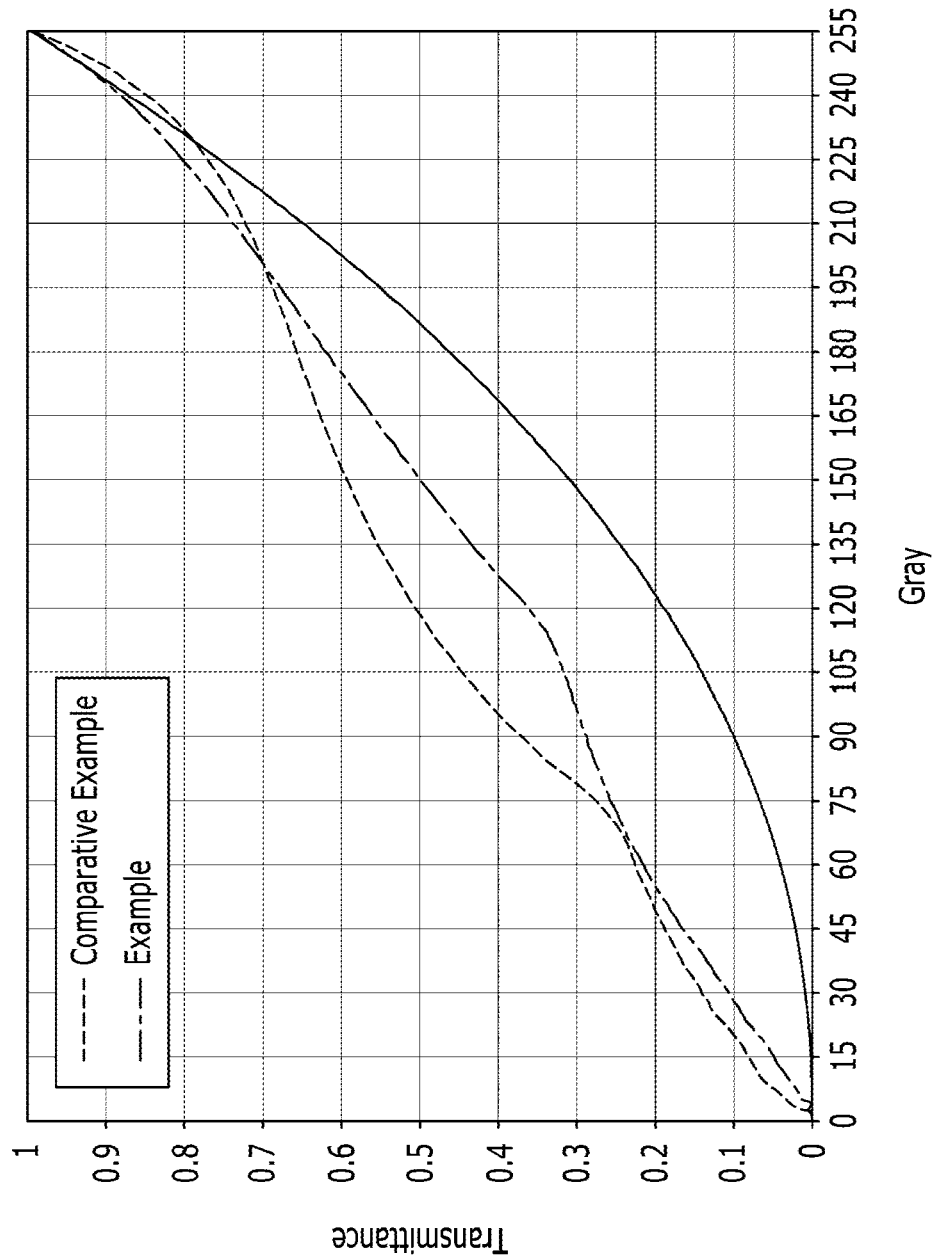
FIG. 14 illustrates a gamma curve graph related to an Example associated with an embodiment of the present invention and a gamma curve graph related to a Comparative Example.

FIG. 14 illustrates a gamma curve graph related to an Example associated with an embodiment of the present invention and a gamma curve graph related to a Comparative Example. Referring to FIG. 14, the Example associated with an embodiment of the present invention has a gamma curve closer to an ideal gamma curve than the Comparative Example. In other words, the Example associated with an embodiment of the present invention has improved visibility compared to the Comparative Example.

Figure 15:
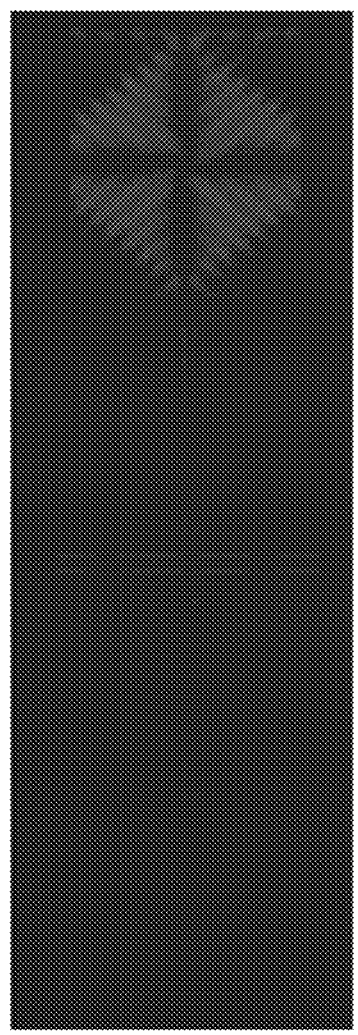
FIG. 15, FIG. 16, and FIG. 17 illustrate pixel images related to Examples associated with embodiments of the present invention.
Figure 16:
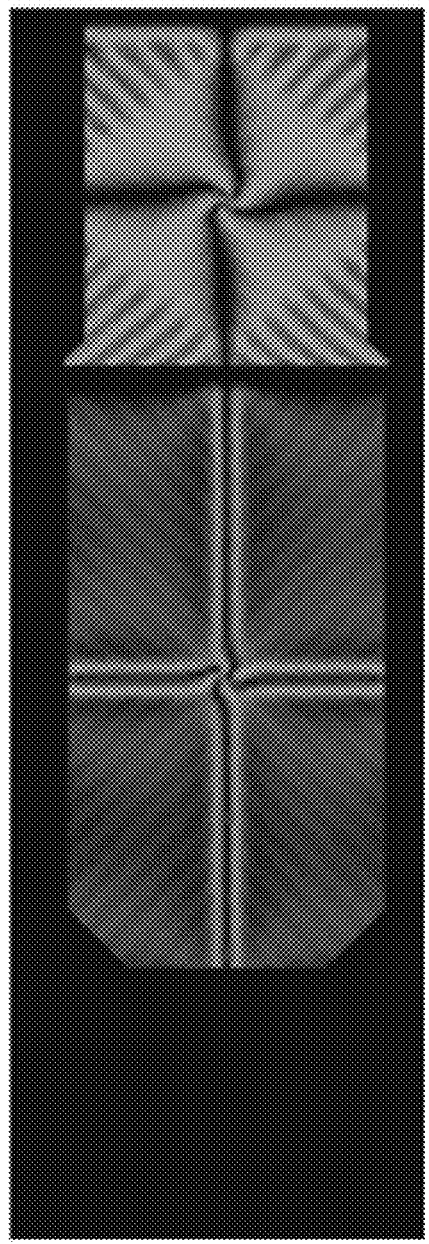
Figure 17:
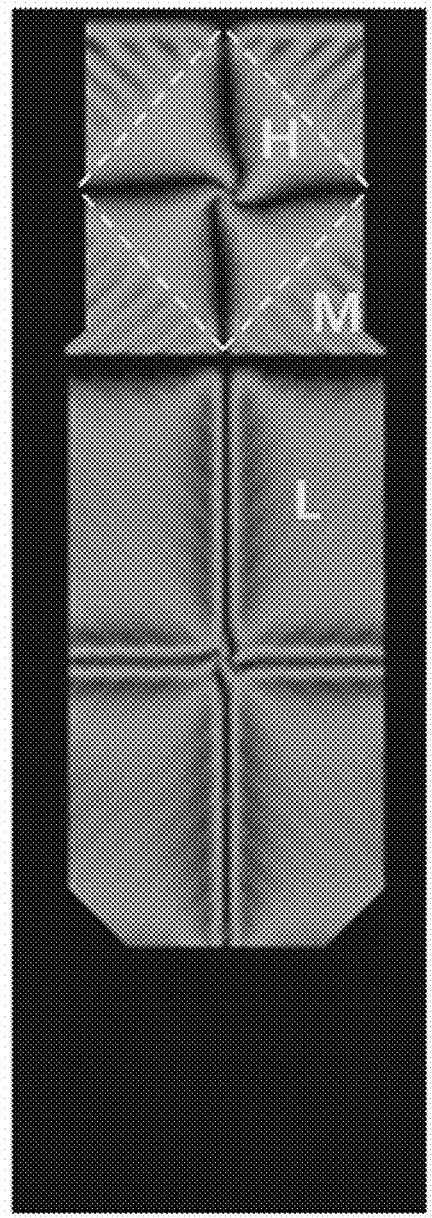

FIG. 15, FIG. 16, and FIG. 17 illustrate pixel images related to Examples associated with embodiments of the present invention. Referring to FIGS. 15 to 17, the pixel electrode is driven at a low gray (2.8 V). The pixel electrode, the common-voltage electrode and the floating electrodes are driven at a halftone gray (4.5 V) over the first region, the second region, and the third region so as to have different luminance values, and driven at a high gray (8.0 V) so as to have higher luminance values. Given the different luminance values at different regions, side visibility of images may be improved.

Figure 18A:
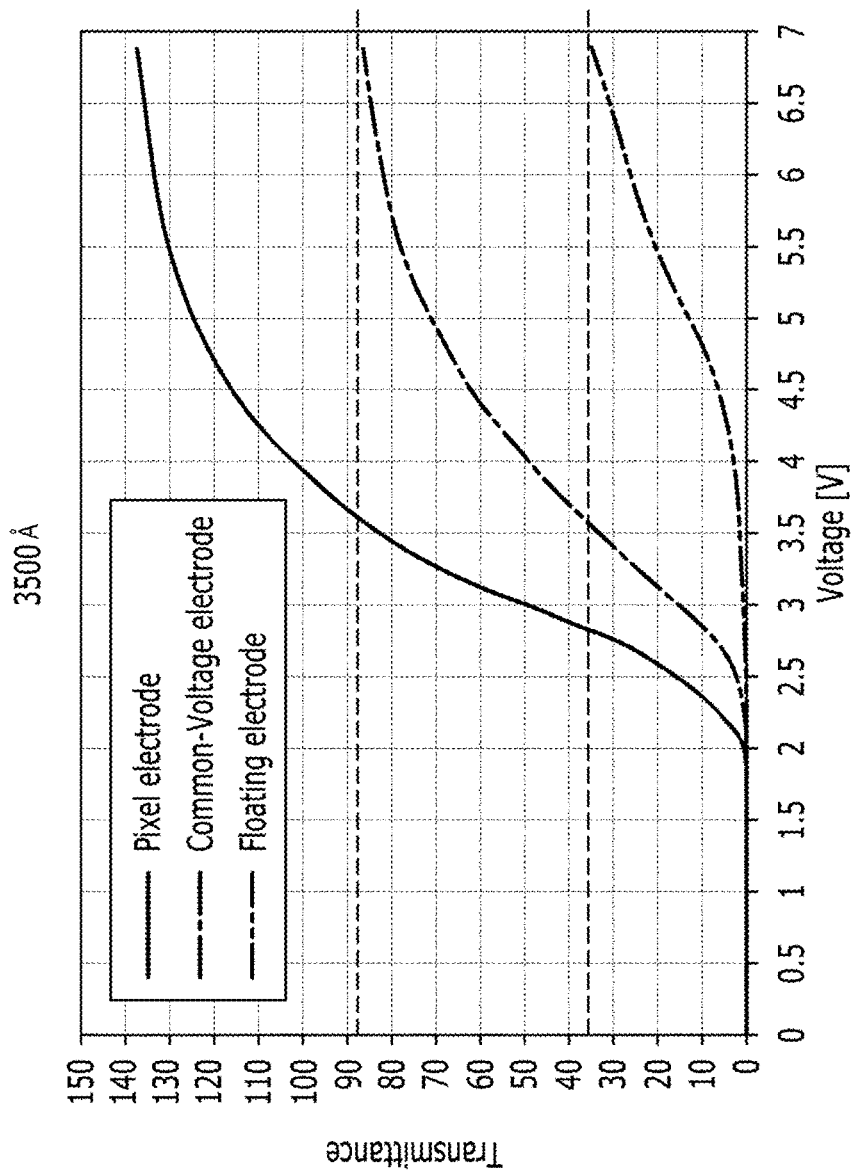
FIG. 18A, FIG. 18B, and FIG. 18C illustrate V-T graphs related to insulating layer thicknesses between electrodes according to embodiments of the present invention.
Figure 18B:
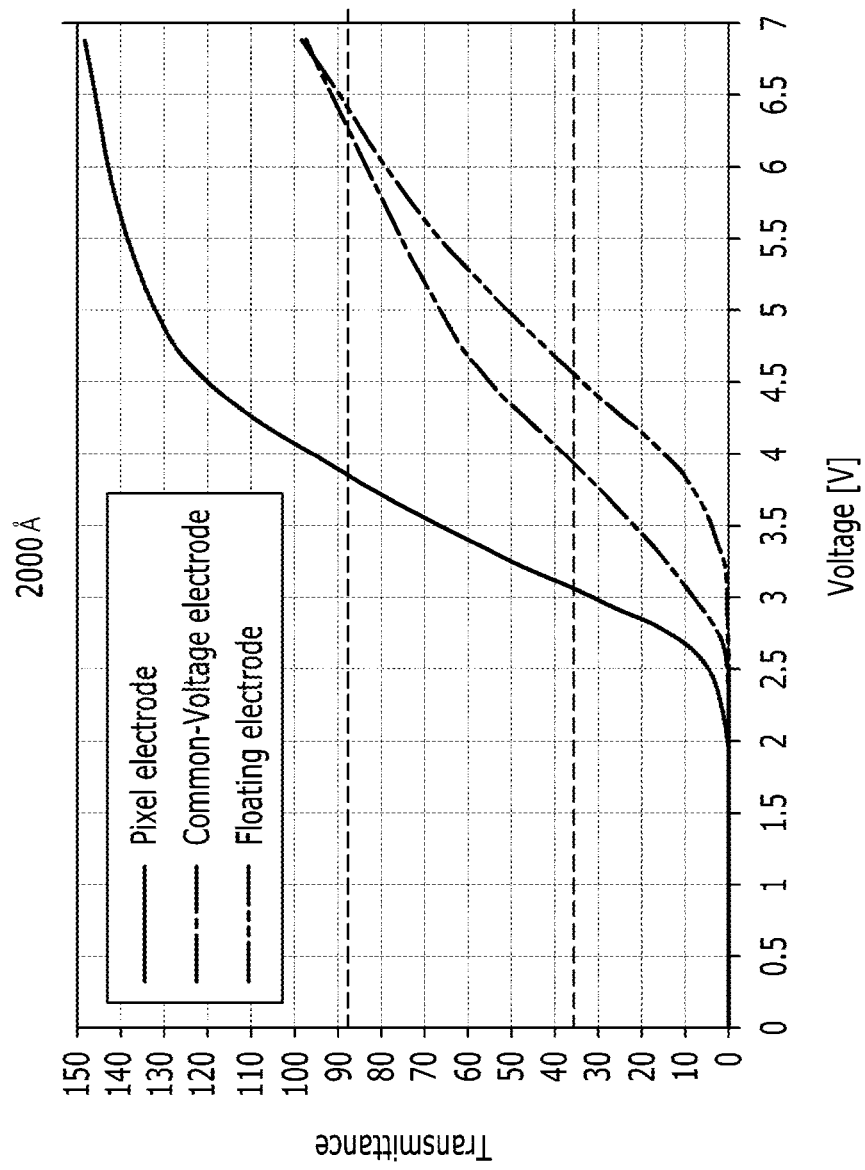
Figure 18C:
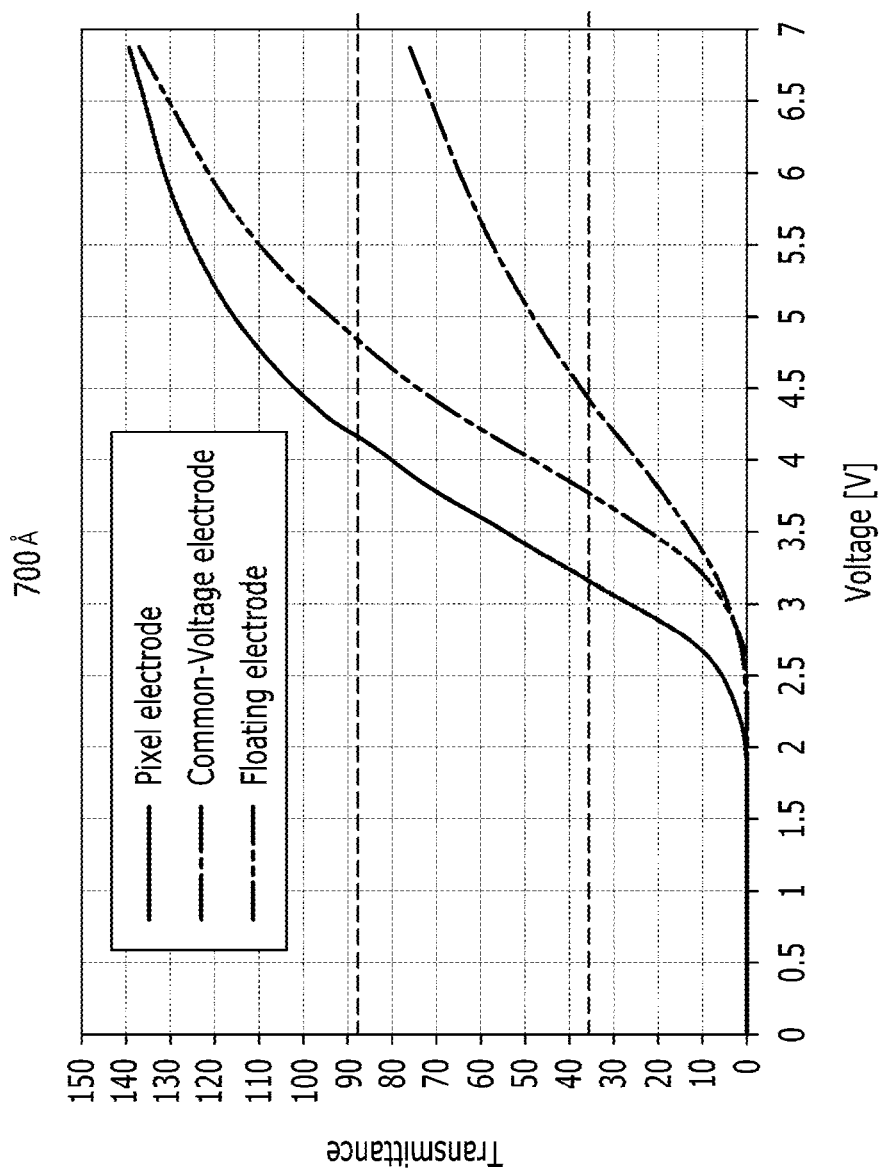

FIG. 18A, FIG. 18B, and FIG. 18C illustrate voltage-transmittance (V-T) graphs related to thicknesses of the second passivation layer between the pixel electrode and each of the common-voltage electrode and the floating electrode according to embodiments of the present invention.

As the thickness of the second passivation layer is reduced at a position of the common-voltage electrode, transmittance associated with the display may deteriorate. Transmittance associated with the display device is improved as the thickness of the second passivation layer is reduced at a position of the floating electrode. In other words, the common-voltage electrode and the floating electrode show opposite characteristics according to the thickness of the second passivation layer. Therefore, according to embodiments of the present invention, the second passivation layer may have different thicknesses in the region where the common-voltage electrode is positioned and the region where the floating electrode is positioned. Advantageously, the display device may have improved transmittance.

Figure 19:
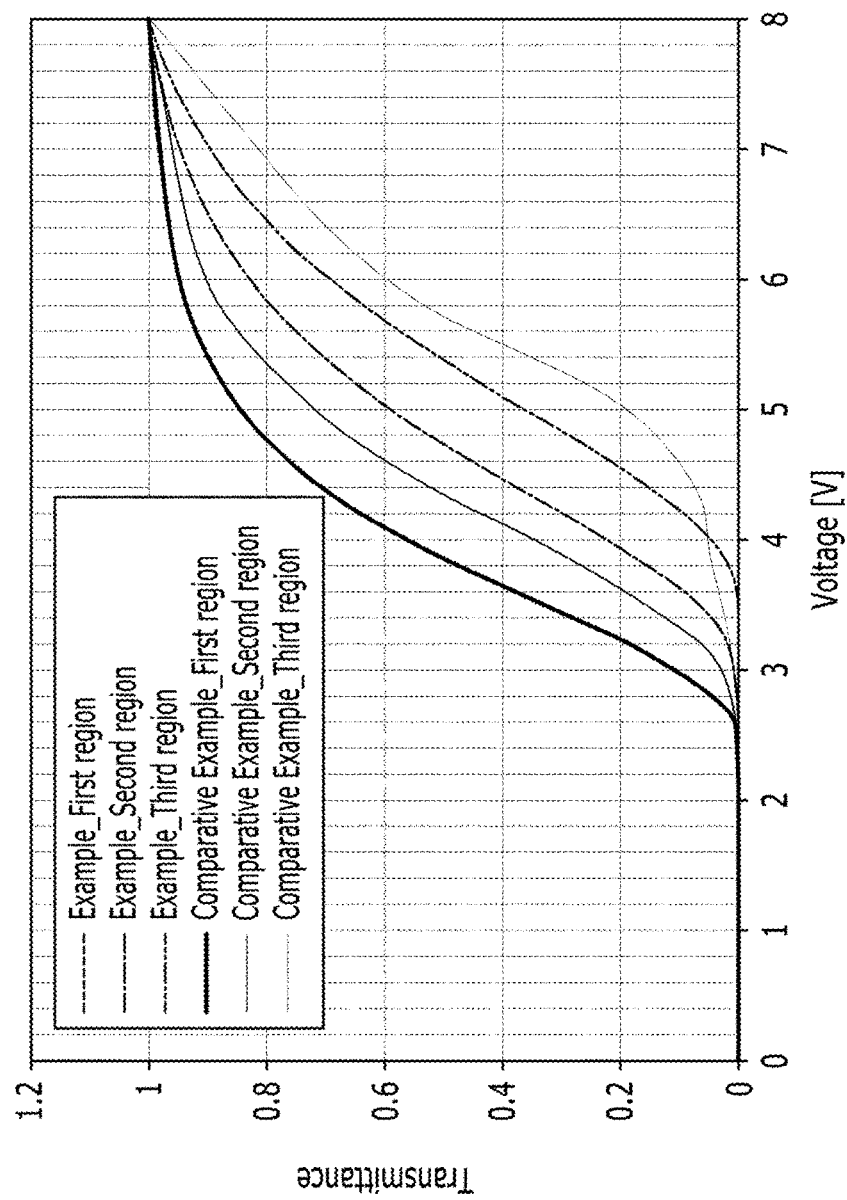
FIG. 19 illustrates V-T graphs related to Examples associated with embodiments of the present invention and V-T graphs related to Comparative Examples.

FIG. 19 illustrates V-T graphs related to the examples associated with embodiments of the present invention and V-T graphs related to the Comparative Examples. Referring to FIG. 19, when the second passivation layer has a single thickness, an aspect indicated by a solid line is shown, but different thicknesses are applied to the regions where the common-voltage electrode and the floating electrode are positioned, such that optimized visibility may be provided, as indicated by a dotted line.

According to embodiments of the present invention, each pixel area of a display device may be divided into three regions that have different electric field magnitudes. Therefore, each pixel areas may have different luminance values. Advantageously, the display device may display images with satisfactory visibility and/or satisfactory resolution. For providing the three different luminance levels, the pixel may need only one transistor. Advantageously, a satisfactory aperture ratio may be attained, such that potential afterimage may be alleviated. Relations among the three different electric field magnitudes may be optimized though configuration of distances between electrodes in the pixel. Advantageously, a response speed and/or image texture control associated with the display device may be optimized.

While embodiments of this invention have been described, this invention is not limited to the described embodiments. This invention is intended to cover various modifications and equivalent arrangements included within the spirit and scope of the appended claims.

What is claimed is:

1. A display device comprising:
a floating electrode, which is electrically floating;
a common-voltage electrode, which is electrically connected to a voltage source and encloses an opening;
a transistor; and
a pixel electrode, which is electrically connected to the transistor, wherein a first portion of the pixel electrode overlaps neither of the floating electrode and the common-voltage electrode in a direction perpendicular to at least one of the pixel electrode and an image display side of the display device and is positioned over the opening in the direction, wherein a second portion of the pixel electrode overlaps the common-voltage electrode, and wherein a third portion of the pixel electrode overlaps the floating electrode,
wherein a material of the common-voltage electrode is identical to a material of the floating electrode.

2. The display device of claim 1, further comprising:
a common electrode; and
a liquid crystal layer, which is positioned between the pixel electrode and the common electrode, wherein the pixel electrode is positioned between the liquid crystal layer and the common-voltage electrode.

3. The display device of claim 1, wherein the common-voltage electrode is spaced from the transistor in a plan view of the display device.

4. The display device of claim 1, wherein the floating electrode is positioned between two portions of the common-voltage electrode.

5. The display device of claim 1, wherein the third portion of the pixel electrode overlaps a center portion of the floating electrode.

6. The display device of claim 1, wherein the third portion of the pixel electrode overlaps at least two edges of the floating electrode.

7. The display device of claim 1, wherein the second portion of the pixel electrode surrounds the first portion of the pixel electrode.

8. The display device of claim 1, wherein the third portion of the pixel electrode is positioned closer to the transistor than at least one of the first portion of the pixel electrode and the second portion of the pixel electrode.

9. The display device of claim 1, further comprising: a non-conductive member, which directly contacts each of the floating electrode and the common-voltage electrode.

10. The display device of claim 9, wherein the non-conductive member includes at least one of a color filter, a light-blocking member, and an overcoat.

11. The display device of claim 1, further comprising: a passivation layer, which directly contacts each of the floating electrode, the common-voltage electrode, and the pixel electrode.

12. A display device comprising:
a floating electrode, which is electrically floating;
a common-voltage electrode, which is electrically connected to a voltage source;
a transistor; and
a pixel electrode, which is electrically connected to the transistor, wherein a first portion of the pixel electrode overlaps neither of the floating electrode and the common-voltage electrode in a direction perpendicular to at least one of the pixel electrode and an image display side of the display device, wherein a second portion of the pixel electrode overlaps the common-voltage electrode, and wherein a third portion of the pixel electrode overlaps the floating electrode, wherein the common-voltage electrode has two slits, and wherein a branch part of the pixel electrode is positioned between the two slits in a plan view of the display device.

13. A display device comprising:
a floating electrode, which is electrically floating;
a common-voltage electrode, which is electrically connected to a voltage source;
a transistor;
a pixel electrode, which is electrically connected to the transistor, wherein a first portion of the pixel electrode overlaps neither of the floating electrode and the common-voltage electrode in a direction perpendicular to at least one of the pixel electrode and an image display side of the display device, wherein a second portion of the pixel electrode overlaps the common-voltage electrode, and wherein a third portion of the pixel electrode overlaps the floating electrode; and
a passivation layer, which directly contacts each of the floating electrode, the common-voltage electrode, and the pixel electrode, wherein a first portion of the passivation layer overlaps the floating electrode in the direction, wherein a second portion of the passivation layer is positioned between the pixel electrode and the common-voltage electrode in the direction, and wherein a thickness of the first portion of the passivation layer in the direction is less than a thickness of the second portion of the passivation layer in the direction.

14. The display device of claim 13, wherein a third portion of the passivation layer overlaps the floating electrode in the direction and is positioned between the first portion of the passivation layer and the second portion of the passivation layer, wherein the thickness of the first portion of the passivation layer in the direction is less than a thickness of the third portion of the passivation layer in the direction.

15. The display device of claim 14, wherein the thickness of the third portion of the passivation layer in the direction is less than the thickness of the second portion of the passivation layer in the direction.

16. The display device of claim 13, wherein a third portion of the passivation layer is positioned between the pixel electrode and the common-voltage electrode and is positioned between the first portion of the passivation layer and the second portion of the passivation layer, wherein a thickness of the third portion of the passivation layer in the direction is less than the thickness of the second portion of the passivation layer in the direction.

17. The display device of claim 16, wherein the thickness of the third portion of the passivation layer in the direction is equal to the thickness of the first portion of the passivation layer in the direction.

18. The display device of claim 13, wherein a third portion of the passivation layer overlaps the common-voltage electrode without overlapping the pixel electrode in the direction and is positioned between the first portion of the passivation layer and the second portion of the passivation layer, wherein a thickness of the third portion of the passivation layer in the direction is less than the thickness of the second portion of the passivation layer in the direction.

19. The display device of claim 18, wherein the thickness of the third portion of the passivation layer in the direction is greater than or equal to the thickness of the first portion of the passivation layer in the direction.

* * * * *